(12) United States Patent
Anzai

(10) Patent No.: US 10,717,118 B2
(45) Date of Patent: Jul. 21, 2020

(54) PLASMA MELTING METHOD FOR PROCESSING MATERIAL TO BE PROCESSED, AND PLASMA MELTING FURNACE USED THEREFOR

(71) Applicant: Setsu Anzai, Tokyo (JP)

(72) Inventor: Setsu Anzai, Tokyo (JP)

( * ) Notice: Subject to any disclaimer, the term of this patent is extended or adjusted under 35 U.S.C. 154(b) by 0 days.

(21) Appl. No.: 16/095,522

(22) PCT Filed: Apr. 21, 2017

(86) PCT No.: PCT/JP2017/016005
§ 371 (c)(1),
(2) Date: Oct. 22, 2018

(87) PCT Pub. No.: WO2017/195570
PCT Pub. Date: Nov. 16, 2017

(65) Prior Publication Data
US 2019/0126330 A1    May 2, 2019

(30) Foreign Application Priority Data

May 13, 2016   (JP) .................. 2016-096843

(51) Int. Cl.
*B09B 1/00*       (2006.01)
*B09B 3/00*       (2006.01)
*B09B 5/00*       (2006.01)

(52) U.S. Cl.
CPC ............ *B09B 3/005* (2013.01); *B09B 3/0083* (2013.01); *B09B 5/00* (2013.01); *B09B 2220/06* (2013.01)

(58) Field of Classification Search
CPC .............. B09B 3/005; H05B 7/18; H05B 7/20
See application file for complete search history.

(56) References Cited

U.S. PATENT DOCUMENTS 5,535,234 A * 7/1996 Bullmann ............... B09B 3/005
110/234
2009/0249919 A1   10/2009 Degel

FOREIGN PATENT DOCUMENTS

CA           985909 A      3/1976
CN           2705716 Y     6/2005
(Continued)

OTHER PUBLICATIONS

Machine translation of JP2009-073940A printed Jan. 16, 2020.*
(Continued)

*Primary Examiner* — Janine M Kreck
(74) *Attorney, Agent, or Firm* — Kratz, Quintos & Hanson, LLP

(57) ABSTRACT

[Problem] The purpose of the present invention is to provide: a plasma melting method for performing, on a material to be processed such as incineration ash and general waste or industrial waste, a processing in which plasma is generated at a low voltage in the upper part of a furnace and the material to be processed is efficiently subjected to a melt-processing; and a plasma melting furnace used for the plasma melting method.
[Solution] This invention is characterized in that: a coke layer is first laid on the furnace bottom of a plasma electric melting furnace in which a metal layer is placed on the furnace bottom and in which a plurality of electrodes can be moved vertically by an electrode raising/lowering device, and some of a material to be processed that is at least one among general waste, industrial waste, and incineration ash is charged onto the coke layer; the lower ends of the electrodes are positioned near the furnace bottom and the passage of current is commenced at a low voltage; the lower ends of the electrodes are raised while the passage of current is stable; the material to be processed is subjected to an additional charge; plasma is generated at the lower part of (Continued)

the electrodes at an operation voltage obtained by raising the voltage to a high voltage from the low voltage applied during the stable passage of current; and the material to be processed is subjected to a melt-processing.

3 Claims, 2 Drawing Sheets

(56) References Cited

FOREIGN PATENT DOCUMENTS

| CN | 103608115 A | 2/2014 |
|----|-------------|--------|
| CN | 204388068 U | 6/2015 |
| JP | S48-90915 A | 11/1973 |
| JP | H9-196573 A | 7/1997 |
| JP | H10-218643 A | 8/1998 |
| JP | H11-57653 A | 3/1999 |
| JP | H11-237018 A | 8/1999 |
| JP | 2001-50528 A | 2/2001 |
| JP | 2002-213726 A | 7/2002 |
| JP | 2004-257631 A | 9/2004 |
| JP | 2006-40619 A | 2/2006 |
| JP | 2009-73940 A | 4/2009 |
| JP | 2009-522450 A | 6/2009 |
| JP | 2009-249711 A | 10/2009 |

OTHER PUBLICATIONS

Machine translation of JP2009-040619A printed Jan. 16, 2020.*
International Search Report for International Application No. PCT/JP2017/016005 dated Jun. 20, 2017 (2 Sheets).
Office Action of Chinese Patent Application No. 201780029627.1: First Notice of Rejection dated Jul. 1, 2019 (6 sheets).

* cited by examiner

PLASMA MELTING METHOD FOR PROCESSING MATERIAL TO BE PROCESSED, AND PLASMA MELTING FURNACE USED THEREFOR

TECHNICAL FIELD

The present invention relates to a plasma melting method for melt-processing materials to be processed, such as general wastes, industrial wastes and incineration ashes produced during incineration of such wastes, as well as to a plasma melting furnace for use in such a method.

BACKGROUND ART

Incineration ashes produced when general wastes and industrial wastes are incinerated below 900° C. contain toxic substances such as PCB, dioxins, lead and cadmium. Among other means to process such toxic substances, incinerators that operate using common fuels are incapable of processing these toxic substances.

As a means to process incineration ashes, a technique using an electric resistance furnace for melt-processing has been proposed. In particular, JP 2002-254052A discloses one such technique for melt-processing incineration ash. In this technique, a gas drawn out from within a hermetic electric resistance melting furnace is subjected to a dust collection process. The processed gas is circulated back into the melting furnace. While the dust collection process of the furnace gas is repeated, incineration ashes are charged into the melting furnace where they are melted. The resulting exhaust gas discharged from the melting furnace is then introduced into an exhaust gas-processing unit.

Thermal plasma is used as a means to process general industrial wastes, such as melt-processing of incineration ashes. Use of thermal plasma can insolubilize incineration ashes discharged from garbage incinerators and heavy metals present in the incineration ashes and can decompose dioxins to make them harmless. In 1994, an experimental furnace was installed in Matsuyama in a plant for melt-processing incineration ashes using thermal plasma.

CITATION LIST

Patent Document

Patent Document 1: JP 2002-254052 A

SUMMARY OF INVENTION

Technical Problem

In the conventional technique for melt-processing incineration ashes using a conventional electric resistance furnace, however, the heat source is located at the bottom of the furnace, which leads to an increased amount of time required for heat transfer to the top of the incineration ashes that have a low bulk density and low heat conductance. This makes the melt-processing process time-consuming.

Also, the conventional thermal plasma technique for processing incineration ashes requires high voltage operation in order to generate plasma. During this process, the incinerator ash in the incinerator is agitated and emits undesired dust and gaseous components that can diffuse out from the furnace to contaminate work environments.

Accordingly, it is the objective of the present invention to provide a plasma melting method for processing materials to be processed and a plasma melting furnace for use in the method, that enables efficient melt-processing of the materials to be processed, such as general wastes, industrial wastes and incineration ashes, by generating plasma in the upper portion of the furnace at a low voltage. In this manner, the present invention addresses problems associated with the conventional techniques.

Solution to Problem

In order to address the above-described problems, one plasma melting method according to the present invention for processing a material to be processed is characterized by including providing a plasma electric melting furnace having a metal layer disposed at the bottom of the furnace and a plurality of electrodes vertically movable by an electrode elevator; initially placing coke at the bottom of the furnace; charging a part of a material to be processed that is at least one of a general waste, an industrial waste and an incinerating ash, over the coke; initiating power supply at a low voltage with lower ends of the electrodes positioned near the bottom of the furnace; lifting upwards the lower ends of the electrodes while the power is stabilized; charging an additional amount of the material to be processed; and applying an operational voltage higher than the low voltage applied during the stable power supply to cause plasma generation below the electrodes and to thereby melt-process the material to be processed.

In one embodiment, the plasma melting method according to the present invention for processing a material to be processed is characterized in that the low voltage applied during the stable power supply is 70 V and the operational voltage is in a range of 100 to 200 V.

In one embodiment, the plasma melting method according to the present invention for processing a material to be processed is characterized in that a manganese ion source is added to the material to be processed that is charged during application of the operational voltage.

In a further aspect, a plasma electric melting furnace according to the present invention for processing a material to be processed is characterized by including a metal layer disposed on the bottom of the furnace; a plurality of graphite electrodes vertically movable by an electrode elevator; a power source; and an electrode power controller in electrical communication with the power source to control the current and voltage of the power supplied to the plurality of the graphite electrodes.

Advantageous Effects of the Invention

According to the method of the present invention, which includes providing a plasma electric melting furnace having a metal layer disposed at the bottom of the furnace and a plurality of electrodes vertically movable by an electrode elevator; initially placing coke at the bottom of the furnace; charging a part of a material to be processed that is at least one of a general waste, an industrial waste and an incinerating ash, over the coke; initiating power supply at a low voltage with lower ends of the electrodes positioned near the bottom of the furnace; lifting upwards the lower ends of the electrodes while the power is stabilized; charging an additional amount of the material to be processed; and applying an operational voltage higher than the low voltage applied during the stable power supply to cause plasma generation below the electrodes and to thereby melt-process the material to be processed, the voltage applied to the electrodes positioned near the bottom of the furnace during the stable power phase can be made sufficiently low to prevent the generation of submerged plasma, which would otherwise damage the bottom of the furnace. Subsequently, the electrodes are lifted upwards such that stable plasma is generated at the lower ends of the electrodes upon application of the operational voltage. As a result, effective melt-processing of the materials to be processed is achieved.

According to one embodiment of the present invention, in which the low voltage applied during the stable power supply is 70 V and the operational voltage is in a range of 100 to 200 V, the plasma generation during the sable power phase can be minimized to prevent damage to the bottom of the furnace. In addition, the material to be processed can be prevented from being agitated during application of the operational voltage. As a result, stable plasma generation and, thus, effective melt-processing of incineration ashes are achieved.

According to one embodiment of the present invention, in which a manganese ion source is added to the material to be processed that is charged, permanent plasma can be generated in the upper portion of the furnace.

According to one embodiment of the present invention, which comprises a metal layer disposed on the bottom of the furnace; a plurality of graphite electrodes vertically movable by an electrode elevator; a power source; and an electrode power controller in electrical communication with the power source to control the current and voltage of the power supplied to the plurality of the graphite electrodes. A plasma electric melting furnace, therefore, can be realized that is structurally simple while achieving efficient plasma melting processing of the materials to be processed.

DESCRIPTION OF EMBODIMENTS

Figure 1:
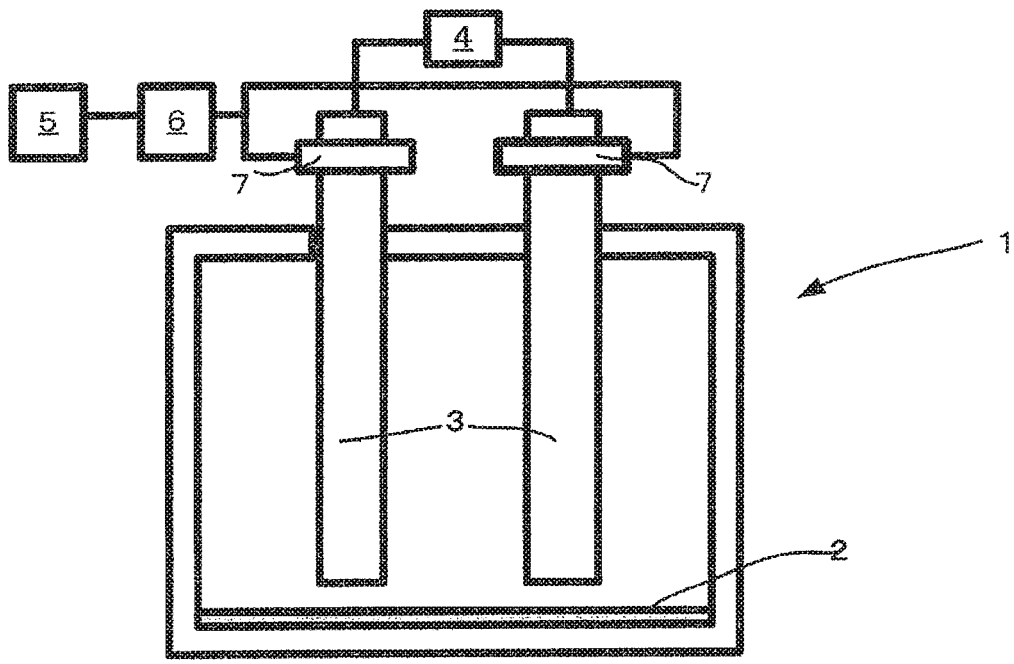
FIG. 1 is a drawing showing one embodiment of the present invention.

Embodiments of the present invention will now be described with reference to the accompanying drawings. FIG. 1 is a schematic diagram showing a plasma electric melting furnace 1 in accordance with the present invention for processing materials to be processed, such as general wastes, industrial wastes and incineration ashes.

The plasma electric melting furnace 1 includes a metal layer 2 disposed at the bottom of the furnace. Also arranged in the plasma electric melting furnace 1 are a plurality of graphite electrodes 3 that are vertically movable by an electrode elevator 4. Electric power is supplied to the graphite electrodes 3 via clamps 7 with the electric current and voltage being controlled by a power controller 6.

In a typical electric furnace, submerged arc plasma is generated at the bottom of the furnace. The plasma generated at the bottom of the furnace can damage the furnace bottom and is thus undesirable. High-voltage operation will be required in order for the plasma to reach to the top portion of the furnace. Such high-voltage operation, however, agitates the incineration ash in the furnace and causes the ash to emit undesired dust and gaseous components that diffuse out from the furnace to contaminate work environments. According to the present invention, the power is stabilized at a low voltage to minimize the plasma generation at the bottom of the furnace. When the power was stabilized, the voltage was increased to an operational voltage. In this manner, a plasma zone was formed below the tips of the electrodes without agitating the incinerator ash.

Figure 2:
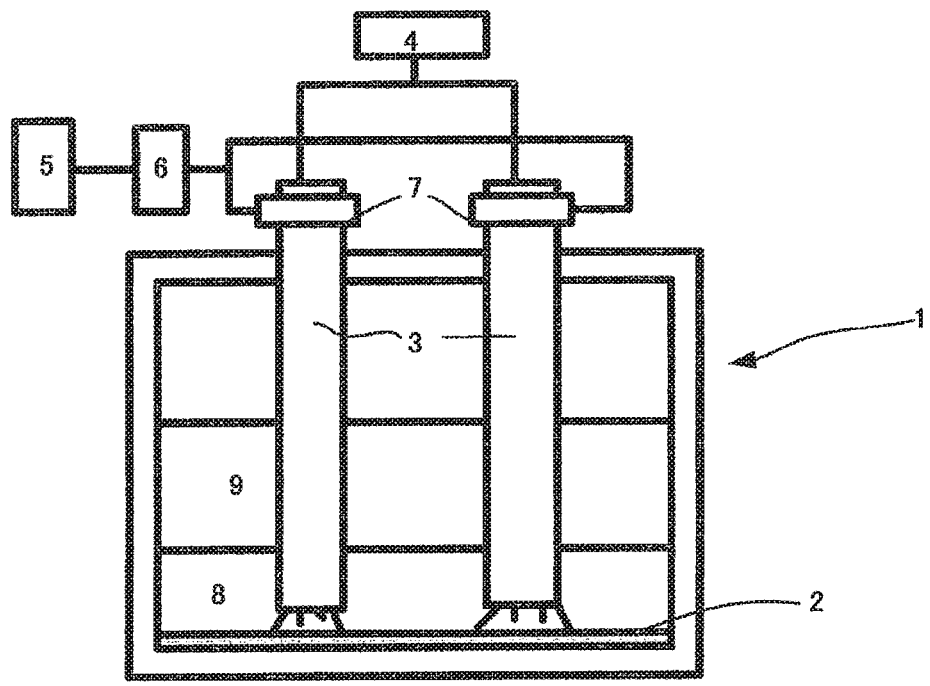
FIG. 2 is a drawing showing one embodiment of the present invention.

FIG. 2 is a diagram showing the state of the plasma electric melting furnace 1 before the power is stabilized. Here, the distance between the lower ends of the plurality of graphite electrodes 3 and the metal layer 2 was 10 cm. A coke layer 8 was overlaid on top of the metal layer 2. 100 kg of a material to be processed 9, which was at least one of general wastes, industrial wastes and incinerator ashes, was then charged onto the coke layer 8. A 70-V stabilized power voltage was applied, but no plasma generation was observed at the bottom of the furnace. The composition of the material to be processed 9 was as follows: 23% CaO; 27% $SiO_2$; 14% $Al_2O_3$; 6% $Fe_2O_3$; and 1.1% Cl. Power was applied starting after 20 min at which time an additional amount of the material to be processed 9 was charged.

Figure 3:
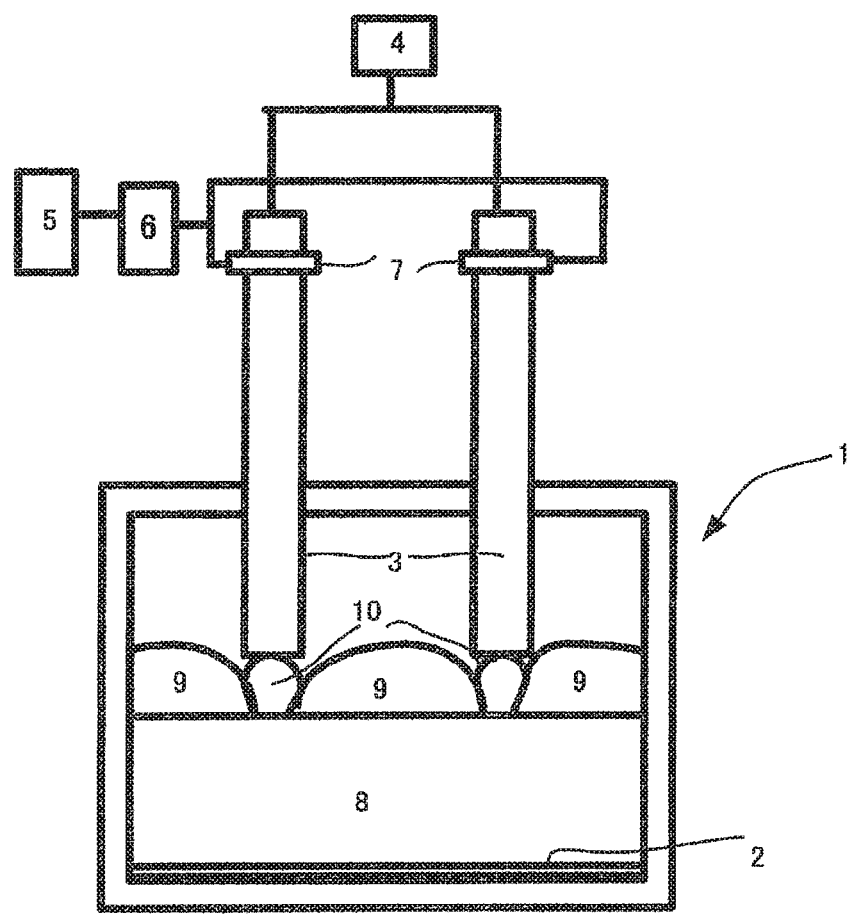
FIG. 3 is a drawing showing one embodiment of the present invention.

FIG. 3 is a diagram showing the state in which the operational voltage is applied following the stable power phase. Once the power had been stabilized, the distance between the lower ends of the plurality of graphite electrodes 3 and the metal layer 2 was increased to 100 cm. Additional 300 kg of the material to be processed 9 were then charged. The operational voltage was increased then from the 70-V stabilized power voltage to 150 V. In this state, plasma 10 was generated at the lower ends of the plurality of the graphite electrodes 3. Since the operational voltage was kept as low as 150 V, the plasma generation was associated with minimized agitation of the material to be processed 9.

During the operation under the operational voltage, 50 kg of manganese Us slag was charged when necessary, Charging a manganese ion source, such as Mn ore and ferromanganese slag, allows generation of permanent plasma in the upper portion of the furnace. In addition, 200 kg of the material to be processed 9, 70 kg of silica sand, and 35 kg of manganese slag were charged and the operation was continued. Plasma was generated throughout the furnace and the material to be processed was effectively melt-processed.

The applied voltage, power consumption, and presence or absence of plasma during the stable power phase and the operational voltage phases are shown in Table 1 below.

TABLE 1

| | Voltage | Power consumption per ton of material | Plasma generation |
|---|---|---|---|
| Stable power phase | 70 V | 200 kWh/ton | None |
| Operational phase, initial stage | 150 V | 900 kWh/ton | Plasma generated at lower ends of electrodes |
| Operational phase, stable stage | 150 V | 850 kWh/ton | Plasma generated throughout the furnace |

According to the plasma melting method of the present invention for processing a material to be processed, a stable plasma atmosphere at a temperature of 1500° C. or higher can be achieved during operation. This provides fast melting and volume reduction of the incineration ash and also helps make the incineration ash harmless during the melt-processing of incineration ashes.

In addition to the materials to be processed, such as general wastes, industrial wastes and incineration ashes, other materials were processed by the method of the present invention. Specifically, similar procedures were conducted by charging, instead of the material to be processed, briquettes obtained for example by dispersing polychlorinated biphenyl and a surfactant in an inorganic powder by sonication. As a result, the briquettes dissolved quickly and the resulting emission met the environmental standards. This demonstrates that the furnace of the present invention can also serve as a safe furnace for decomposing PCV.

It is speculated that in the future, the plasma melting method of the present invention for processing a material to be processed is used to melt the low level radioactive wastes. The molten product is then vitrified by encapsulating in a slag.

As set forth, according to the plasma melting method of the present invention for processing a material to be processed and the plasma electric melting furnace, the voltage applied to the electrodes positioned near the bottom of the furnace during the stable power phase is sufficiently low to prevent the generation of submerged plasma, which would otherwise damage the bottom of the furnace. Subsequently, the electrodes are lifted upwards such that stable plasma is generated at the lower ends of the electrodes upon application of the operational voltage. This enables effective melt-processing of the materials to be processed.

REFERENCE SIGNS LIST

1: plasma electric melting furnace
2: metal layer
3: graphite electrode
4: electrode elevator
5: power source
6: power controller
7: clamp
8: coke
9: incineration ash
10: plasma

The invention claimed is:

1. A plasma melting method for processing a material to be processed, characterized by comprising:
   providing a plasma electric melting furnace having a metal layer disposed at the bottom of the furnace and a plurality of electrodes vertically movable by an electrode elevator;
   initially placing a coke layer at the bottom of the furnace;
   charging part of a material to be processed, wherein the material to be processed is at least one of a general waste, an industrial waste and an incinerating ash, over the coke layer;
   initiating power supply at a low voltage with lower ends of the electrodes positioned near the bottom of the furnace;
   lifting upwards the lower ends of the electrodes while the power is stabilized;
   charging an additional part of the material to be processed; and
   applying an operational voltage higher than the low voltage applied during the stable power supply to cause plasma generation below the electrodes and to thereby melt-process the material to be processed.

2. The plasma melting method for processing a material to be processed according to claim 1, characterized in that the low voltage applied during the stable power supply, is 70 V and the operational voltage is in a range of 100 to 200 V.

3. The plasma melting method for processing a material to be processed according to claim 1, characterized in that a manganese ion source is added to the material to be processed that is charged during application of the operational voltage.

* * * * *